US009536407B2

(12) United States Patent
Todasco et al.

(10) Patent No.: US 9,536,407 B2
(45) Date of Patent: Jan. 3, 2017

(54) EMERGENCY MONITORING OF TAGGED OBJECTS

(71) Applicant: PAYPAL, INC., San Jose, CA (US)

(72) Inventors: Michael Charles Todasco, Santa Clara, CA (US); Autumn Paige Crossett, Santa Clara, CA (US); James Fussell, Sunnyvale, CA (US)

(73) Assignee: PayPal, Inc., San Jose, CA (US)

( * ) Notice: Subject to any disclaimer, the term of this patent is extended or adjusted under 35 U.S.C. 154(b) by 54 days.

(21) Appl. No.: 14/585,893

(22) Filed: Dec. 30, 2014

(65) Prior Publication Data

US 2016/0189514 A1 Jun. 30, 2016

(51) Int. Cl.
*G08B 21/02* (2006.01)
*H04W 4/02* (2009.01)
*H04W 4/04* (2009.01)
*H04W 4/22* (2009.01)

(52) U.S. Cl.
CPC ............... *G08B 21/02* (2013.01); *H04W 4/02* (2013.01); *H04W 4/04* (2013.01); *H04W 4/22* (2013.01)

(58) Field of Classification Search
CPC ............ H04W 4/04; H04W 4/22; H04W 4/02; H04M 11/04; H04M 1/72533; G08B 21/02; H04B 5/0062; G01S 5/0289; G01S 5/0278
USPC ........... 340/10.1, 12.5, 10.34, 825.49, 572.1, 340/539.13
See application file for complete search history.

(56) References Cited

U.S. PATENT DOCUMENTS

| | | | | |
|---|---|---|---|---|
| 6,127,917 A * | 10/2000 | Tuttle | ..................... | G06K 17/00 340/10.1 |
| 7,327,251 B2 * | 2/2008 | Corbett, Jr. | ........ | G08B 21/0261 340/5.2 |
| 8,222,996 B2 * | 7/2012 | Smith | ................ | G06K 19/0723 340/10.1 |
| 2013/0229263 A1 * | 9/2013 | Graczyk | ................... | G01S 1/70 340/10.1 |
| 2014/0375431 A1 * | 12/2014 | Cristache | .............. | G01S 13/876 340/10.1 |
| 2015/0350848 A1 * | 12/2015 | Eramian | ................. | H04W 4/04 455/404.2 |

* cited by examiner

*Primary Examiner* — Ali Neyzari
(74) *Attorney, Agent, or Firm* — Haynes and Boone, LLP

(57) ABSTRACT

There are provided systems and methods for remote monitoring of tagged physical objects in an emergency. A user may set up a series of beacons at a facility of the user, such as an office or hospital. The beacons may connect to tag devices as the devices enter a coverage area for the wireless beacons or upon request by a service provider server in an emergency situation. The beacons communicate distance information regarding the tag devices and associated physical objects to a service provider server. The service provider server may determine the location of a physical object and provides the location to the user or to emergency personnel. In an emergency, the service provider server may provide a notification to a specific subset of users, in which the notification includes the location of a physical object of interest to the subset of users because of the emergency condition.

17 Claims, 7 Drawing Sheets

EMERGENCY MONITORING OF TAGGED OBJECTS

TECHNICAL FIELD

The present application generally relates to remote location and monitoring of physical objects and more specifically to providing beacons throughout a location that may connect to one or more tag devices associated with various objects in order to locate and monitor those objects.

BACKGROUND

In an emergency situation, finding and monitoring certain physical objects becomes increasingly important. For example, in an earthquake people may be injured increasing the need to find a first aid kit or other piece of emergency equipment. However, the very conditions brought on by the emergency, e.g. dust, debris, smoke, etc., can make finding such objects more difficult. The ability of quickly locating such emergency equipment for use by those present in the emergency, whether by emergency responders, bystanders, or victims of the emergency, may be a matter of life and death.

Additionally, situations may arise in which certain key items, such as a computer containing highly sensitive information or a prototype device under development in a costly research and development program, should be monitored in the event of an emergency. For example, if a fire breaks out in part of a building, there may be time to ensure that irreplaceable items are safely removed from the building.

However, many surveillance and tracking systems can cost tens of thousands or hundreds of thousands of dollars to deploy and maintain on a large scale. Accordingly, current systems for locating and monitoring physical objects within a facility are not satisfactory in all respects.

Figure 1:
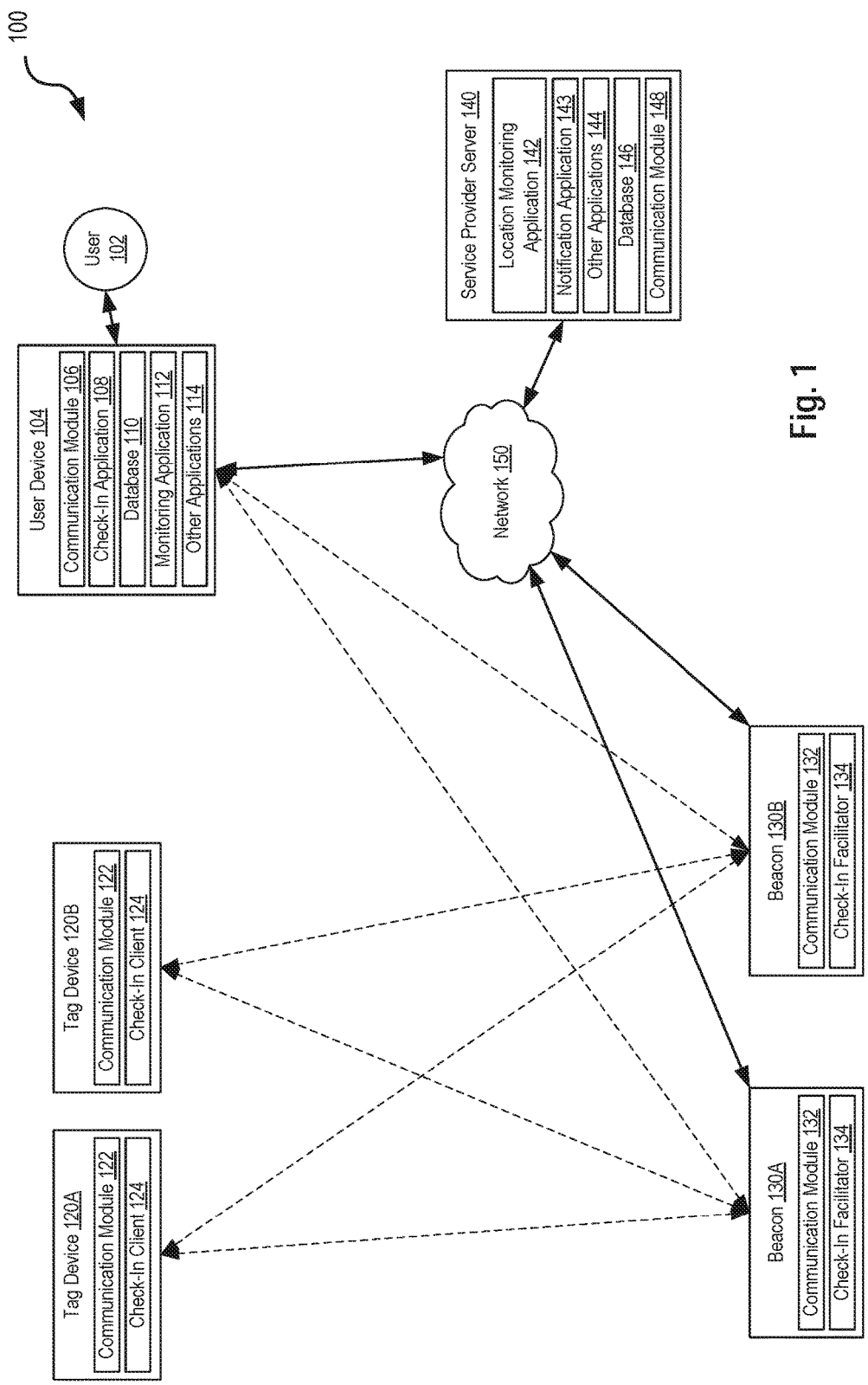
FIG. 1 is a block diagram of a networked system suitable for implementing the features described herein, according to some aspects of the present disclosure.

Embodiments of the present disclosure and their advantages are best understood by reference to the following detailed description. It should be appreciated that like reference numerals are used to identify like elements illustrated in one or more of the figures. However, such repetition of reference numerals to identify similar elements is for ease of explanation and should not be construed as limiting the present disclosure.

DETAILED DESCRIPTION

Embodiments of the present disclosure may enable a user of an associated service to monitor a plurality of physical objects that are tagged with tag devices in the event of an emergency. The physical objects may be monitored to detect their presence within a facility or within a specific portion of the facility and/or their location within the facility.

A user, such as a business or corporation, a security company, a homeowner, a caretaker, or a guardian of another individual or individuals, may set up one or more wireless beacons throughout a location in which various physical objects are present. These physical objects can be any item or collection of items that are considered important enough to a user to merit monitoring. For example, such physical objects may include a safe, a file cabinet, a file folder, a document, a computer, a smartphone, a prototype, a piece of equipment, a person, or an animal. Short-range wireless beacons may be established throughout a facility such as an office building, a factory, a shopping center, a stadium, a hotel, etc. The wireless beacons utilize short-range wireless communications to detect a tag device (or simply, a "tag") on, possessed by, or attached to the physical object or to another physical object likely to be associated with the physical object to be monitored. The tag device may communicate with one or more wireless beacons.

One or more of these beacons may be set up at a location to communicate with various tag devices or tags to detect proximity to the beacon or beacons. In some embodiments in which a tag device is embedded or incorporated into a user device, the beacons may communicate with the tag device to inform certain users of check-in services through their user devices. In some embodiments, the beacons may provide additional functionality, such as establishing a connection with a server entity to complete transactions, including check-in services, and to provide information that is pertinent to the location.

The beacons may employ one or more wireless communication modes, including Bluetooth Low Energy (BLE) communications provided by BLE interfaces included in the beacons. The beacons emit a BLE signal receivable by the tag device or devices. The communications may include an identifier of the originating beacon, an identifier for the tag device, a service user, and/or a service provider identifier offering monitoring and/or check-in services through the wireless beacons. The tag device may be set up to passively monitor for BLE communications. When the tag device detects the signal and verifies the one or more identifiers, both the tag device may ramp up in power and establish a connection, where the connection may further enable the tag device to communicate with the beacon or beacons or with a service provider's server through the beacons or through another communication channel. For example, in the event of an emergency, a beacon may request that tag devices within range of the beacon self-identify to indicate their presence. The tag devices may respond with a communication that includes an identifier of the tag device.

The beacons may use a received signal strength indicator (RSSI), which is a measurement of the power in a received communication or signal from the tag device or devices. An individual beacon may use the RSSI to calculate the distance between the beacon and a responding tag device, and this calculated distance may be used to represent the distance between the beacon and the physical object to be tracked or monitored, i.e., the physical object to which the tag device is attached or in which the tag device is included. When multiple beacons are present within a facility, and within a limited communication range of the beacon, multiple distances may be obtained. When the locations or the relative locations of the beacons are known, these multiple distances may be used to calculate a location of the tag device, and thereby a location of the physical object to monitored. In many instances herein, reference is made to identifying the location of the physical object or to monitoring the physical object. As indicated, the location of the physical object is determined by the location of the tag device associated with the physical object. By monitoring a location of the tag device, the physical object is effectively monitored.

The beacons may be connected to a networked device at the facility or in another location. For example, a set of beacons may be positioned within and/or around a factory and connected to a network device within the factory, in an adjacent building, or in another location. The beacons may include network functionality to communicate with other devices and/or servers, including a user device of the service user and a service provider server. By providing multiple distances between a set of beacons and a particular tag device to the service provider server, the service provider server may calculate the location of the tag device.

In some embodiments, a user may limit the range of the beacon to a distance within the facility and spread multiple wireless beacons throughout the location. Thus, each wireless beacon may correspond to an area of the facility (e.g., an office, a conference room, a wing, a kitchen, a storage room, a restroom, a lobby, a stairway, an entrance, an exit, etc.). Therefore, when a connection is established between the tag device and one of the wireless beacons, a location for the tag device (and its associated physical object) may be determined based on the connection and knowledge of where the particular wireless beacon forming the connection with the tag device is located within the facility. Using the wireless beacons and the tag device, information may be determined by monitoring the device's presence and/or movement throughout the location based on the connections the device makes with the wireless beacons.

The wireless beacons may also provide assistance in monitoring one or more tagged physical objects during and after an emergency. Examples of such an emergency may include an earthquake, a fire, an intentional or accidental explosion, a terrorist attack, a structural failure, etc. In certain circumstances, a service provider server may receive a notification of such an emergency and provide instructions to the beacons to enable them to monitor the locations and or movements of tagged physical objects. The wireless beacons may also be connected to smoke alarms, fire sprinklers, intercoms, automated locks, etc., which may provide information indicating an emergency condition and thereby prompting the wireless beacons to monitor the locations and movements of the physical objects.

When an emergency or a warning of an impending emergency is received, the beacons may communicate with the tag devices to determine their respective locations. By comparing the locations of the tagged physical objects with either previously acquired locations or subsequently acquired locations, the service provider server may determine whether or not a particular physical object is present and whether or not the particular physical object has moved or whether or not the particular physical object is moving. The service provider server may communicate with one or more user devices to provide one or more users with information regarding the locations of the tagged physical objects. In some embodiments, the service provider server may provide different information to different users according to their needs for specific information. For example, a service user located at a corporate headquarters may be provided with information describing locations of the tagged physical objects when an emergency occurs at one of the corporation's offices. As another example, a service user that is present in the facility may be provided with information describing some of the tagged physical objects, like a particular computer known to contain highly sensitive information or a fire escape or first aid kit. As long as the computer, the fire escape, and the first aid kit are tagged with a tag device, each of these physical objects may be located within the facility, and their respective locations may be provided to service users.

FIG. 1 is a block diagram of a networked system 100 suitable for implementing the processes described herein, according to an embodiment. As shown, system 100 comprises or implements a plurality of devices, servers, and/or software components that operate to perform various methodologies in accordance with various aspects of the present disclosure. It is to be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user device 104 associated with a user 102, a first tag device 120A, a second tag device 120B, a first beacon 130A, a second beacon 130B, and a service provider server 140 in communication over a network 150. The user 102 may be a person, such as a service provider, an office manager, a facilities manager, a supervisor, an employee, a caretaker, a student, a resident at a home, etc., and may utilize the user device 104 to connect to one or both of the beacons 130A and 130B (referred to collectively as beacons 130) and to the service provider server 140.

The user device 104 may be implemented using any appropriate hardware and software configured for wired and/or wireless communication with beacons 130 and/or service provider server 140. For example, the user device 104 may be implemented as a smartphone, laptop computer, a tablet computing device, a wearable computer, such as a wristwatch with appropriate computer hardware resources or eyeglasses with appropriate computer hardware (e.g. GOOGLE GLASS®), and/or other types of computing devices capable of transmitting and/or receiving data.

As illustrated, the user device 104 includes a communication module 106, a check-in application 108, a database 110, and a monitoring application 112, and may include other applications 114. In the illustrated embodiment, the communication module 106 provides more than one mode of communication. For example, when the user device 104 is within range of the beacons 130, the communication module 106 may transmit wireless communications to either or both of the beacons 130 using a first mode of communication, such as Bluetooth Low Energy (BLE). For example, the communication module 106 (of user device 104 or one of the tag devices 120A and 120B) may alternatively communicate with beacons 130 using another mode (e.g., over near field communication, Bluetooth, radio, infrared, LTE Direct, or other connection). The communication module 106 may also enable communication between the network 150 using a second mode of communication, such as a Wi-Fi or cellular connection or a wired connection.

Check-in application 108 may be used by user 102 of user device 104 to establish a connection with the beacons 130, including a check-in using service provider server 140 or another device/server. Check-in application 108 may correspond to a specific application utilized by user device 104 in connection with the service provider server 140 to complete a check-in for a location corresponding to the locations of the beacons 130. The check-in with service provider server 140 may correspond to a process to log in to a user account of user 102 with service provider server 140. In other embodiments, the check-in may provide and/or verify the identity of user 102, including transmission of an identifier for user 102 and/or user device 104. The check-in may be completed over network 150 with service provider server 140. In such embodiments, check-in application 108 may correspond more generally to a browser application configured to communicate with service provider server 140.

The user device 104 may further include database 110 which may include, for example, identifiers such as operating system registry entries, cookies associated with check-in application 108, other applications 114, and/or a monitoring application 112, identifiers associated with hardware of user device 104, or other appropriate identifiers, such as identifiers used for payment/user/device authentication or identification. Identifiers stored in the database 110 may be used by an emergency location service provider, such as service provider server 140, to associate user device 104 with a particular account maintained by the provider. Database 110 may include user device tokens and/or encryption keys, including an encryption key of the beacons 130 and/or service provider server 140. Database 110 may include identifying information for tokens enabling check-in application 108 to identify the beacons 130 and/or service provider server 140 when receiving a corresponding check-in token.

Database 110 may further include information corresponding to user 102, including vital statistics, messages, or other information, which may be transmitted to service provider server 140. Information from database 110 may be utilized by service provider server 140 in conditions, emergencies, and/or situations that may arrive at a location that includes the beacons 130. Information received from service provider server 140 may also be stored to database 110, including messages from other users, alerts regarding tagged physical objects, location/statistic information regarding the tagged physical objects and/or other users, and/or information for the location corresponding to the beacons 130 (e.g., a map, floor plan, layout, etc., of the facility containing the beacons 130).

The monitoring application 112 may be executed to provide an interface whereby user 102 may monitor the location/present and/or movement of tagged physical objects and/or other users. Thus, monitoring application 112 may receive information from service provider server 140 about tagged physical objects (e.g., computers containing sensitive information, fire extinguishers, safes, first aid kits, etc.) currently at a location with the facility including the beacons 130. For example, user 102 may utilize monitoring application 112 to view a building, an area, and/or room that the tagged physical object is located in by virtue of the connection between a tag device associated with the physical object and wireless beacons 130 in the area. In an emergency situation, the user 102 may be informed of the location of such tagged physical objects and may be alerted of the movement of any tagged physical objects. Service provider server 140 may also track the locations and movements of tagged physical objects in an emergency and update user 102 of the movement throughout the facility using monitoring application 112.

In some embodiments, as part of the process of receiving check-in information from the check-in application 108 of the user device 104, the beacons 130A and 130B may each determine a distance to the user device 104 and provide data representing that physical distance to the service provider server 140. The additional information may be routed to user device 104 and/or another user device of another user (e.g., the emergency personnel, etc.) and may be overlaid on a map or representation of the facility along with the locations of one or more tagged physical objects, thereby enabling the user 102 to user the user device 104 to locate the tagged physical objects using the monitoring application 112. In other embodiments, the determination of a distance between each of the beacons 130 and the user device 104 may not be part of a check-in process. In those other embodiments, the determination of distances may be performed without any affirmative action on the part of the user 102.

Two tag devices 120A and 120B are also depicted in the system 100 of FIG. 1. Many more tag devices may be included in other embodiments. The tag devices 120A and 120B (collectively referred to as tag devices 120) may be simpler and smaller devices than the user device 104, and may include fewer components and provide fewer features. As such, the tag devices 120 may be more cheaply deployed to facilitate the locating and monitoring of many different physical objects that may be of importance during an emergency situation. Tag devices 120 may be attached, fixedly or releasably, to a physical object or included within the physical object. The tag devices 120 may each include one or more microprocessors, memories, and other appropriate components for executing instructions such as program code and/or data stored on one or more computer-readable media to implement the various applications, data, and steps described herein. As shown, the tag devices 120 further include a communication module 122 and a check-in client 124.

As illustrated herein, the tag devices 120, like the user device 104, are in communication with the beacons 130 through a wireless communication channel. In some embodiments, this wireless communication channel is a Bluetooth Low Energy (BLE) channel. In such embodiments, the communication module 122 may be a BLE interface device. Because implementations of Bluetooth Low Energy may consume very little power, the tag devices 120 may utilize a battery as a power source. Thus, the communication modules 122 of the tag devices 120 may provide for communication according to the BLE specification or according to another specification in other embodiments. The tag devices 120 may also be configured to communicate wireless according to other modes, in some embodiments, so that other wireless communication channels may be implemented by the communication module 122.

The tag devices 120 may enable the service provider server 140 to monitor the locations and/or movements of physical objects tagged with the tag devices 120. In an emergency situation, the importance of locating specific physical objects (including people) may increase significantly. For example, while some employees may not be concerned with the location of a fire extinguisher on a day-to-day basis, in the event of a fire the importance of locating the fire extinguisher becomes immediately apparent. Additionally, the conditions of an emergency or brought on by the emergency may increase the difficulty of finding specific physical objects. By attaching the tag devices 120 to specific physical objects, those objects may be found despite the increased difficulty, such as decreased visibility due to dust, smoke, or a power-outage. For example, if an earthquake or tornado moves items within a building or fully or partially collapses or destroys the building, the tag devices 120 may provide information to find the physical objects after the emergency has passed. In an ongoing emergency, during a flood for example, the tag devices 120 may be used to locate physical objects to better secure them or take them to a safer location.

The tag devices 120 may correspond to a small processing device and/or tag that may be included in or attached to nearly any physical object. Such tagged objects may include a safe, a file cabinet, a file folder, a painting, a work of sculpture, a fire extinguisher, a first aid kit, a defibrillator, or other piece of emergency equipment. In an emergency situation, a user may want to locate certain physical objects due to their inherent value or due to valuable contents. In some embodiments, one of the tag devices 120 may be attached to a watch, wallet, necklace, clothing item, admission bracelet, or other wearable piece and configured to establish a communication with beacons 130 in order to monitor a movement or a presence/location of a person having the item thereon. For example, during an emergency, a hospital may use the tag devices 120 to ensure that all of the patients are evacuated from a particular building or portion of a building. In other words, the hospital personnel may use the tag devices 120 to determine whether any patients are still in the building or portion thereof.

Although one user device is shown in FIG. 1, a plurality of user devices may function similarly, and the service provider server 140 may provide location/presence and/or movement information regarding the tag devices 120 to multiple users, such as emergency personnel and a facilities manager.

The check-in client 124 may be used by the tag devices 120 to establish a connection with one or more of the beacons 130, and thereby perform a check-in using service provider server 140 or another device/server. The check-in with service provider server 140 may enable the logging in and the cataloging of the physical objects tagged with one of the tag devices 120. The check-in may be completed over network 150 with service provider server 140. The check-in client 124 may facilitate automatic responses to requests from the beacons 130. For example, when an emergency occurs, the beacons 130 may request a response for any tag devices 120 within range. The check-in client 124 may automatically respond with a message or signal, including information such as a tag device identifier. The check-in client 124 may be configured, in some embodiments, to broadcast a message or signal periodically to the beacons 130 to indicate the presence of the tag device. This message or signal may be used by the beacons 130 to obtain distance information to send to the service provider server 140.

Through the communications modules 122, the check-in clients 124 may receive short-range wireless communications from beacons 130 at a location and transmit information to beacons 130, including check-in information for a check-in process with service provider server 140. The beacons 130 may use a received signal strength indicator (RSSI) from a signal transmitted by the communication modules 122 of the tag devices 120. In some embodiments, another mode of distance-estimation based on the signals from the tag devices 120 may be implemented by the beacons 130. The calculated distance may be used to represent the distance between a particular beacon and the physical object to be tracked or monitored. As is discussed in further detail elsewhere in this disclosure, this information may then be communicated by the beacons 130 to the service provider server 140, which to determine a location of each of the tag devices 120 relative to the beacons 130 based on the signals received by the beacons 130. For example, to triangulate the position of the tag device 120A (and thereby the location of the objected tagged therewith) within a facility, the beacons 130 may provide the service provider server 140 with distances from each of the beacons 130 to the tag device 120A. Similarly, the beacons 130 may use a received signal strength indicator (RSSI) from a signal transmitted by the communication module 106 of the user device 104 to estimate a location of the user device 104 relative to the beacons 130. The beacons 130 may use a check-in facilitator 134, which is configured to exchange information with the check-in client 124 and to relay check-in information to the service provider server 140 over the network 150.

In the case of the user device 104, the distances between the beacons 130 and the user device 104 may be used to represent the location of the user 102. The check-in application 108 may transmit information to beacons 130 when user 102 is within range of the beacons 130, enabling service provider server 140 to triangulate the position of user 102 within the facility, when the service provider server 140 is provided with distances from each of the beacons to the user device 104.

As illustrated, the tag devices 120 also include the check-in client 124. In some embodiments, the check-in client 124 of the tag devices 120 may provide fewer features than the check-in application 108 of the user device 104. The check-in client 124 of the tag devices 120 may be provided on the tag devices 120 as an embedded application or as a hardware module configured to interact with the beacons 130 to facilitate the exchange of signals by which a distance of a tag device may be determined. The tag devices 120, which may not include integrated input mechanisms, are able to communicate with the beacons 130 without affirmative user input. Locations of the tag devices 120 may be calculated or estimated based on the distance between the specific tag device and the beacons 130. When a physical object has been associated with the tag device 120A, the service provider server 140 may provide the location of the tag device 120A to the user 102 as the location of the physical object tagged with the tag device 120A, after checking-in the tag device 120A or otherwise updating its location information.

Beacons 130 may broadcast a token, such as a universally unique identifier (UUID), for reception by check-in client 124 or check-in application 108, provided by either one of the tag devices 120 or the user device 104, as detailed in U.S. patent application Ser. No. 14/292,374, entitled "Remote Monitoring of Users at a Home Location," filed May 30, 2014, which is incorporated by reference herein in its entirety. Once a connection is established with beacons 130, the tag devices 120 may be checked-in with the service provider server 140, which may add the identifier of the tag devices 120 into a database of checked-in devices. When the service provider server 140 has a database of tag devices associated with specific physical objects, the service provider server 140 may provide a listing of the corresponding physical objects to the user 102. In some embodiments, the service provider server 140 provides an abbreviated listing of physical objects to the user 102, based on the credentials and/or an access level of the user 102. The listing of physical objects may include only physical objects determined to be relevant or useful to the user 102 because of the specific emergency condition.

In some embodiments, the check-in application 108 of the user device 104 may also receive information from beacons 130, such as emergency information, emergency personnel instructions, communications or messages from another user, maps of a location, etc. In other embodiments, user device 104 may be a small device attached to a wearable item of a person/animal and check-in application 108 may only provide an identifier, check-in information, and/or location information to beacons 130.

As described herein, the beacons 130 each include a communication module 132 that is configured to communicate with the tag devices 120 in a first mode of communication and with the service provider server 140 in another mode of communication. The beacons 130 may include a check-in facilitator 134 and may further include other applications, a database, and other features such as a primary power supply and a secondary or backup power supply. The check-in facilitator 134 may receive check-in information from the check-in clients 124 on the tag devices 120, and in some embodiments, from the check-in application 108 of the user device 104. The check-in facilitator 134 may communicate check-in information through the network 150 to the service provider server 140. In order to maintain the ability to locate and track the tag devices 120 in an emergency, the beacons 130 may be able to switch to the secondary power supply without lapse in service. For example, the beacons 130 may be connected to a building power supply, such as an outlet, and also include an internal battery that may provide power in the event that the building's power supply goes down to continue service during the emergency. Because the tag devices 120 and the user device 104 may also include internal batteries, the beacons 130 may continue to communicate with the tag devices 120 and/or the user device 104 in such an emergency.

Service provider server 140 may be maintained, for example, by an online payment service provider, which may provide check-in and monitoring services on behalf of a user. In this regard, service provider server 140 includes one or more processing applications which may be configured to interact with user device 104 and/or beacons 130 to receive check-in or location information and monitor movement and other information for a person/animal at a location. In one example, service provider server 140 may be provided by PAYPAL®, Inc. of San Jose, Calif., USA. In other embodiments, service provider server 140 may be maintained by or include other service providers. The service provider server 140 may be located within the facility in which physical objects are located, in some embodiments. In other embodiments, the service provider server 140 may be located remotely from the facility. This may be advantageous in the event that an emergency at a given location may disable an on-site service provider server 140.

Service provider server 140 of FIG. 1 includes a location monitoring application 142, a notification application 143, other applications 144, a database 146, and a communication module 148. Location monitoring application 142 and other applications 144 may correspond to processes, procedures, and/or applications executable by a hardware processor, for example, a software program. In other embodiments, service provider server 140 may include additional or different software.

Location monitoring application 142 may process and/or complete a check-in between enabled devices and beacons 130 (e.g., between user device 104 or the tags 120 and beacons 130). Thus, location monitoring application 142 may correspond to the server-side application of service provider server 140 configured to receive check-in information and complete a check-in request. The check-in request may include login information for a user account in database 146 and thus complete the check-in by verifying the account information.

A check-in process as described herein with respect to the tag devices 120 may be different than a check-in process of a user device 104. For example, as part of checking-in the user device 104, the check-in information may include an identifier or other account information for a user/payment account set up with service provider server 140. To check-in the tag devices 120, the location monitoring application 142 may receive other information identifying the physical object associated with the tag device (e.g., a safe, a file cabinet, a computer, a piece of equipment, a first aid kit, a fire extinguisher, a fire escape, a water shutoff, an electrical shutoff, a gas shutoff, the user 102 or another person). As previously discussed, other information may be provided to service provider server 140, including a notification that the tag device or user device is within range to be detected by beacons 130. This information may be provided without performing a check-in process.

Once the information is received from beacons 130 indicating a position or area within a location where an entity having an attached device is located, location monitoring application 142 may determine additional data based on the location information. For example, movement of one or both of the tag devices 120A and 120B may be tracked through a location by monitoring which wireless beacons (e.g., beacons 130) that the device has and/or is connected to and/or by the distances to those beacons of the beacons 130 with which it can connect. A pattern of movement may therefore be deduced by the location monitoring application 142.

The service provider server 140 may further include a notification application 143 that can communicate with the location monitoring application 142. The notification application 143 may receive notifications and also send notifications. For example, the notification application 143 may receive data including a notification from an emergency notification service indicating that an emergency is occurring or may soon occur at a specific facility. The notification application 143 may then direct or request that the location monitoring application 142 determine the location of tagged physical objects and/or user devices within or near the facility. The location monitoring application 142 may then request or direct that the beacons 130 within the facility update their check-in information or other information from which presence and/or distance may be obtained. This may be done by requesting that tag devices 120 and the user device 104 send or resend a communication. If the beacons 130 include a storage device having pre-emergency information stored therein, the beacons 130 may provide this information to the location monitoring application 142 at the request of the notification service 143. In other embodiments, the notification service 143 may provide notification information to the location monitoring application 142, which may then issue requests for new information and/or requests for previously obtained, saved information.

The service provider server 140 may be in communication with various sources that may provide notice or advances information regarding an emergency situation. For example, the notification application 143 may be in communication, through the network 150, with an emergency notification service such as a weather service, a tsunami warning system, an earthquake warning system, etc. In some embodiments, the notification application 143 may determine an emergency is occurring based on a device attached to beacons 130, such as a smoke alarm or fire sprinkler. In other embodiments, the emergency notification service may be provided by the smoke alarm, burglar alarm, fire sprinkler, or another alarm configured to communicate with the beacons 130 in order to communicate with the service provider server 140. In other embodiments, these and other warning devices may be configured to communicate with the service provider server 140, without employing the beacons 130 as intermediaries. Additionally, in some embodiments, the beacons 130 may be programmed to respond automatically upon receipt of warning information from a warning system or device by sending the saved information to the service provider server 140 and by requesting new information from the tag devices 120 and/or user devices 104 and providing this to the service provider server 140 as well. In such embodiments, a notification application may be operating on the beacons 130.

In other embodiments, notification application 143 may also be alerted to the emergency by another entity, such as emergency personnel or a facilities manager. When the service provider server 140 receives an emergency notification at the notification application 143, the location monitoring application 142 may request information from beacons 130 of all devices (e.g., tag devices 120 and the user device 104) in communication with the beacons 130 within the facility being monitored so that the party or parties receiving the location information may be able to locate the physical objects or people corresponding to those devices.

In some embodiments, the request by the location monitoring application 142 may be a request for updated information. In such embodiments, the database 146 may include previously obtained presence and/or location information from tagged physical objects or user devices. The location monitoring application 142 may combine the updated information with the previously obtained information to identify movement of tag devices and user devices, and thereby movement of tagged physical objects and users. Additionally, when a notification of an emergency condition occurs, the location monitoring application 142 may begin to periodically request, receive, and process location/presence information from the beacons 130. Each time new information is received, the location monitoring application 142 may process the data to determine the location of objects within the facility, whether those objects are moving, and a direction of their movement when the objects are moving. Thus, emergency personnel, security personnel, facilities managers, or those with special responsibilities may quickly locate those objects.

For example, in the event of an earthquake some employees in an office may be injured. Other employees or emergency personnel may need to locate a first aid kit in order to help those injured employees. By using a user device, like the user device 104, an employee or other responder may receive information from the location monitoring application 142 to locate the first aid kit as long as it is tagged with a tag device, like the tag device 106A. The responder may move the first aid kit to a first location to help with an injured person. Another employee or another responder may also need the first aid kit. Because the first aid kit is tagged with the tag device 106A, the other employee or responder may receive information indicating that the first aid kit is now in the first location.

In various embodiments, service provider server 140 includes other applications 144 as may be desired in particular embodiments to provide features to service provider server 140. For example, other applications 144 may include security applications for implementing server-side security features, programmatic server applications for interfacing with appropriate application programming interfaces (APIs) over network 150, or other types of applications. Other applications 144 may contain software programs, executable by a processor, including a graphical user interface (GUI), configured to provide an interface to a user.

Additionally, service provider server 140 includes database 146. As previously discussed, user 102 and/or other users may establish one or more user accounts with service provider server 140. User accounts in database 146 may include user information, such as name, address, birthdate, payment/funding information, additional user financial information, and/or other desired user data. The accounts may be linked to through their respective user and/or device identifier. The database 146 may also include listings of tagged physical objects, their tag identifiers, and object identifiers or descriptions. The database 146 may also include layout information of a facility. For example, the database 146 may include a floor plan of a facility, and include the locations of the beacons 130 within that floor plan. In some embodiments, the locations of the beacons 130 may be obtained by having the beacons 130 communicate with each other, a signal strength indicator from those communications may then be used to calculate distances between the beacons 130. As described in connection with the tag devices 120 and the user device 104, these distances may then be used by the location monitoring application 142 to determine the locations of the beacons 130. In some embodiments, a location of one of the beacons may be entered manually onto a floor plan. For example, one of the beacons 130 may be placed in a corner or in another area that is readily distinguishable on a floor plan of the facility. In another embodiment, an external reference, such as a GPS device may be provided as part of the system 100 to properly geo-reference the beacons 130 to the location of the GPS device. The GPS device, or another system, may provide a location fixation signal that may be used to register the location of at least one of the beacons within a large frame of reference, such as a campus or neighborhood.

In some emergency situations, the locations of one or more of the beacons 130, which are described as fixed devices herein, may change. For example, in a partial building collapse, one or more of the beacons 130 may be fixed to a surface, such as a ceiling, in the collapsed portion of the facility. Because of the collapse the position of one or more of the beacons 130 may change. After receiving the emergency notification, the location monitoring application 142 may request an update of the locations of the beacons 130. By comparing this with previously obtained location information or with subsequently obtained location information, movement of the beacons 130 may be detected. In some embodiments, the movement of one or more of the beacons 130 may be provided to emergency responders or others as an indication of damage to the building. After any change in the locations of the beacons 130 has been accounted for, the distances to the tag devices 120 may be determined. In this way, the modeling of the locations of tag devices 120 and the user device 104 may be adjusted to compensate for the new arrangement of beacons 130. By compensating for the new arrangement of beacons 130, accurate location information of tagged physical objects may be provided despite significant structural damage to the facility.

In various embodiments, service provider server 140 includes at least one network interface component 148 adapted to communicate user device 104 and/or beacons 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices. Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
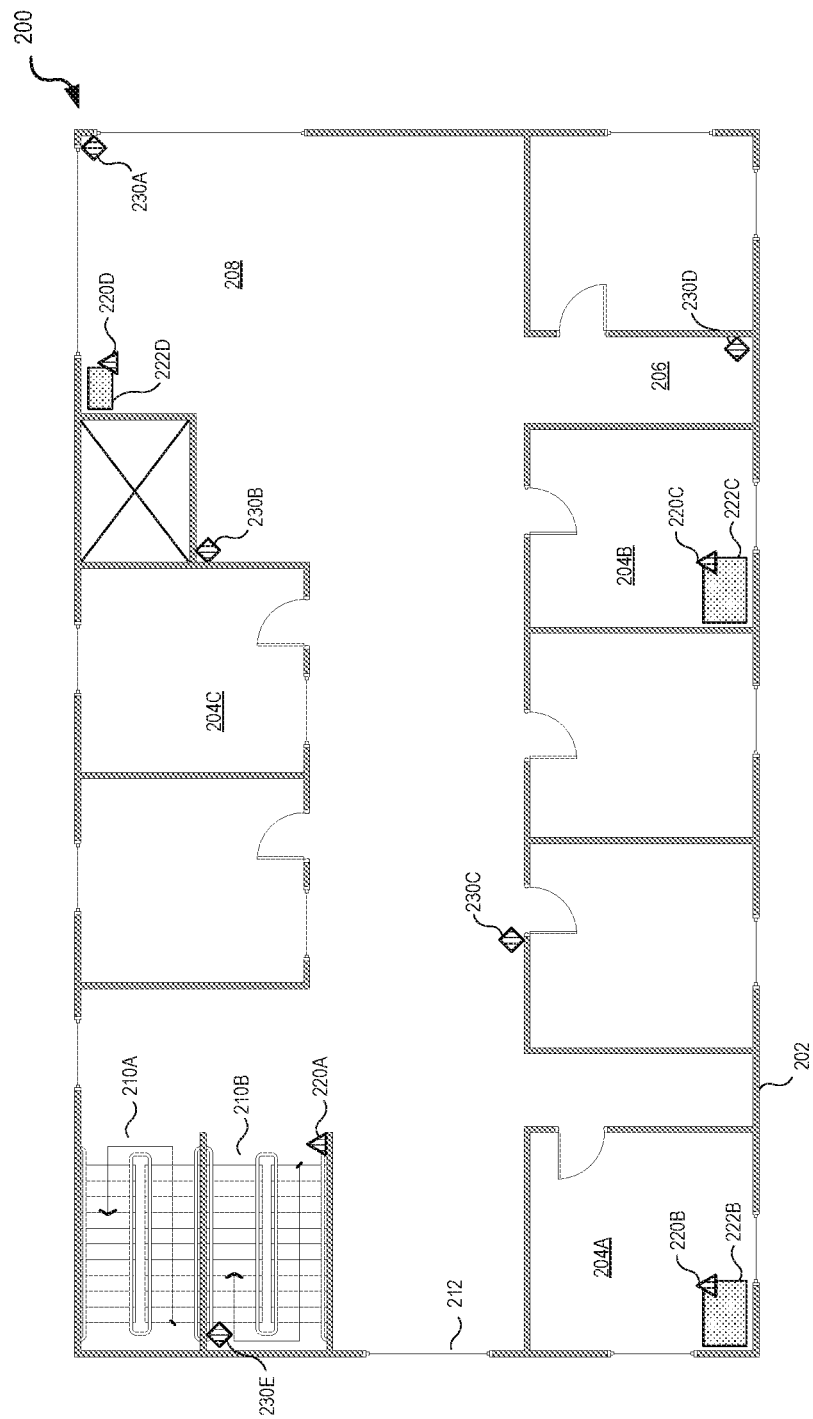
FIG. 2 is an exemplary layout of a facility in which aspects of the networked system of FIG. 1 may be utilized, according to some aspects of the present disclosure.

Referring now to FIG. 2, shown therein is a layout 200 of a facility. As illustrated, the layout 200 is the layout of an office building. In other embodiments, the layout 200 may be the layout of a hospital, a stadium, a college campus or business campus, a zoo, a museum, the house, etc. The layout 200 may be included in the database 146 as a computer file, such as an architectural computer-aided drafting/design (CAD) file. The layout 200 may be associated with other databases in the database 146, such as a database containing the locations of one or more beacons 130, one or more tag devices 120, and one or more user devices like the user device 104. The location monitoring application 142 may be configured to co-register information from one database with another database or file within the database 146. For example, the layout 200 includes exemplary registered information depicting the location of beacons, tag devices, and tagged physical objects within the layout 200.

As shown in FIG. 2, the layout 200 includes wall sections, like the exemplary wall section 202. The various wall sections in the layout 200 combine to provide representations of rooms, such as the rooms 204A, 204B, and 204C, collectively rooms 204. As illustrated, the rooms 204 may be or include offices, laboratories, storage rooms, etc. The wall sections of the layout 200 further described hallways, such as the hallway 206, and open areas, such as the open area 208. The layout 200 further includes a stairway 210A leading up to another floor in the office and a stairway 210B leading down to another floor in the office. Several windows 212 are also included in the layout 200.

As discussed, the location monitoring application 142 may use co-registered data to locate various beacons 130 within the layout 200. As shown in FIG. 2, the layout 200 indicates the locations of beacons 230A, 230B, 230C, 230D, and 230E. The positioning and configuration of the beacons 230 may be selected at installation to provide sufficient coverage to locate responsive devices throughout the floor of the building. Additionally, the location of the beacon 230A corresponds to a corner of the building. As such, during a setup phase of the location monitoring application 142, a user may be able to easily select the placement position of the beacon 230A. Because the beacons 230 may be configured to communicate with each other to determine the relative distances, the positioning of the other beacons and the layout 200 may be automatically performed after the user enters the position of the beacon 230A.

In some embodiments, a beacon may be provided in each room and/or area. The range of the beacon may be limited to the room or area in which the beacon is provided. In such embodiments, the location of a tagged physical object may be understood as the presence or absence of the tagged physical object within a room.

As described herein, the beacons 230 may be used to obtain positioning information for tag devices and user devices present in the building corresponding to the layout 200. As illustrated in FIG. 2, several tag devices are shown attached to physical objects, including movable objects and features of the layout 200 that are not intended to move. For example, the tag device 220A is attached to the stairway 210B. In an emergency situation, where vision is obscured or in which a user is not familiar with the layout of the building, the location of the stairway to which the tag device 220A is attached may be provided to a user, such as the user 102, using a user device, such as the user device 104.

Several other tag devices 220 are included in the layout 200. These tag devices, including tag device 220B, tag device 220C, and tag device 220D are shown as attached to physical objects, 222B, 222C, and 222D, respectively. As described herein, the physical objects to which a tag device may be attached include a safe, a file cabinet, a computer, a data storage device, a first aid kit, a defibrillator, a letter, a food and water supply, or any other physical object that may be of importance for security purposes or safety purposes in the event of an emergency. Additionally, one or more of the physical objects 222B, 222C, and/or 222D may be a person, such as an employee, a patient in a hospital, etc. One or more of the tag devices 220B, 220C, and 220D may be a tag device as integrated into a user device, such as a phone.

For example, the physical object 222D may be a first aid kit. The location of the first aid kit may be determined by determining the location of the tag device 220D. The location of the tag device 220D may be determined by obtaining information describing the distance between the tag device 220D and one or more of the beacons 230. For example, after notification of an emergency is received by the notification application 143, the location monitoring application 142 may request that the beacons 230 obtain information indicative of the location of tagged physical objects within the layout 200. Assuming that the beacons 230A, 230B, and 230D are within range of the tag device 220D, each of the beacons 230A, 230B, and 230D may determine a distance to the tag device 220D. These distances may be provided to the location monitoring application 142, which in turn, triangulates or otherwise obtains the location of the tag device 220D. The location of the tag device 220D may be stored in the database 146. A physical object identifier may be obtained by one or more of the beacons 230A, 230B, and/or 230D and provided to the location monitoring application 142. In some embodiments, prior to deployment of the tag device 220D, the user of the service provider server 140 may enter a physical object identifier associated with the tag device 220D. In this way, the first aid kit represented by the physical object 222D may be associated with the tag device 220D.

The various aspects of the layout 200 are not necessarily drawn to scale. Accordingly, the relationships between physical sizes of features such as a room, a hallway, a stairway, a beacon, a tag device, etc., should not be understood as limited to the illustrated embodiment.

Figure 3A:
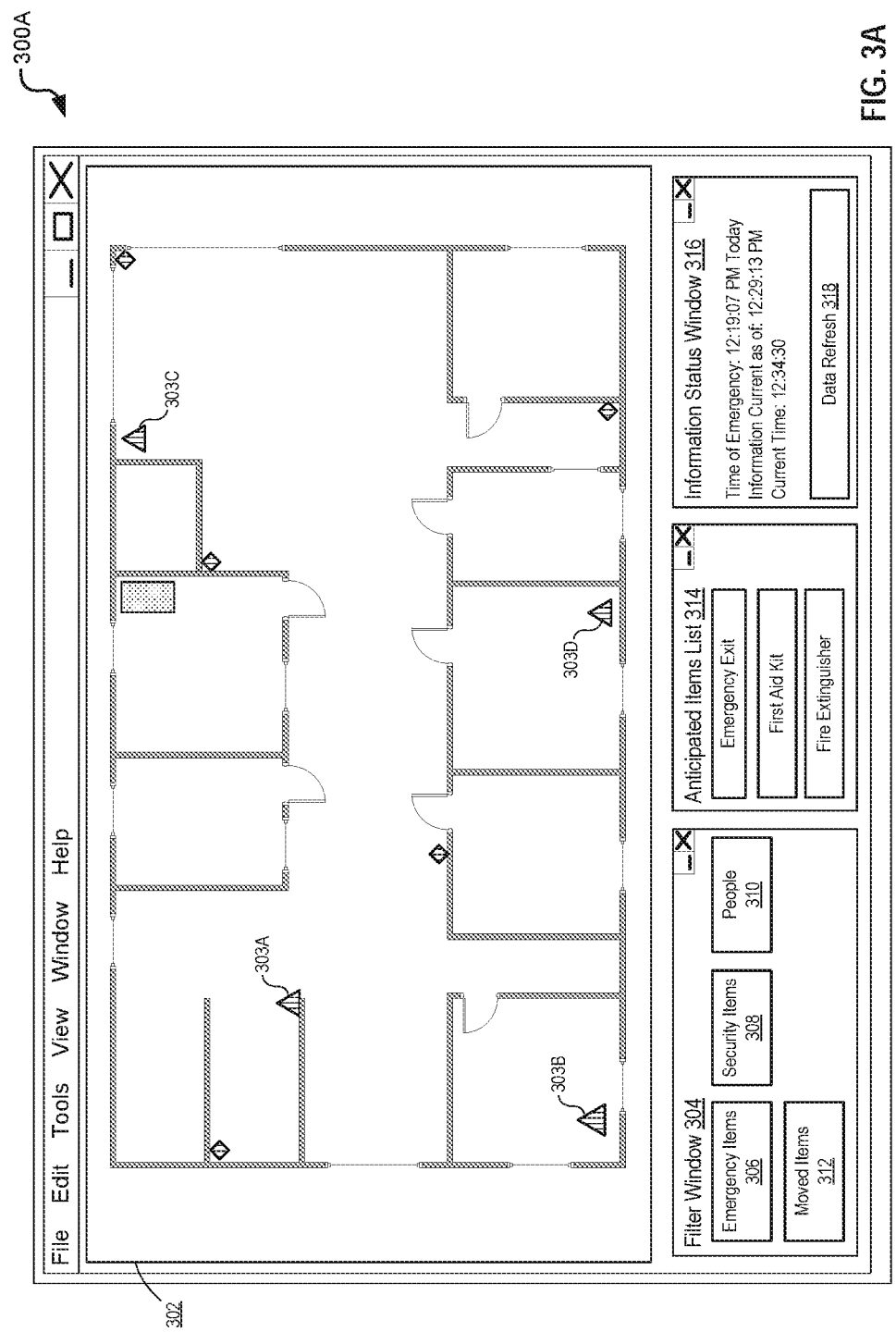
FIG. 3A is an exemplary user interface displaying remote monitoring of tagged objects at a facility during an emergency, according to some aspects of the present disclosure.

FIG. 3A illustrates an exemplary user interface 300 that may be provided to a user to enable the user to obtain information from service provider server 140. As illustrated, the user interface 300 includes several windows. The user interface 300 may be rendered by a user device, such as a laptop, a computer, a tablet, a smartphone, or wearable computer, or any other implementation of the user device 104 of FIG. 1. In some embodiments, some of the windows may be closed and the relative sizes of the windows may be presented differently. The user interface 300 includes a layout window 302, which displays the layout of a facility that is being monitored by the user of the user interface 300. The layout window 302 displays a representation of the layout of the facility, like the layout 200 of FIG. 2. Accordingly, the layout window 302 may provide visual representations of the walls, rooms, and other features of the facility, as well the representations of various system-related devices and/or objects within the facility.

When a user connects to the service provider server 140, the service provider server 140 may determine a level of access to which the user may be permitted. For example, a different level of access may be provided to a facilities manager than to an employee. The facilities manager may be allowed to see the locations of the beacons 230 to enable the facilities manager to determine whether the coverage provided by the beacons 230 is adequate and/or has changed over time or changed as a consequence of an emergency. As another example, an emergency responder may not be permitted to see the locations of sensitive commercial property, but may see representations of people and/or emergency equipment. In some embodiments of the user interface 300, the layout window 302 may highlight or otherwise visually flag any beacons 230 that have moved. In this way, the facilities manager may be able to assess the extent of damage resulting from an emergency. An employee that is using the user interface 300 may be presented with the layout in the layout window 302 that does not depict the beacons 230. This may provide a simpler depiction in the layout window 302 to enable an employee to more readily locate a tagged object such as a first aid kit.

As illustrated in FIG. 3A, the layout window 302 includes representations of the tagged physical objects 303A, 303B, 303C, and 303D. In some embodiments, the layout window 302 may include representations of both the tag devices and the tagged physical objects, as shown in the layout 200 of FIG. 2. In some embodiments of the layout window 302, a representative icon may be presented to convey the location of the tagged physical object. For example, a first aid kit may be represented in the layout 302 with a stylized first aid kit icon. In some embodiments, by selecting a tagged object icon, the user may obtain additional information about the tagged object. Such additional information may include a description of the tagged physical object, a tag device identifier, a status of the tagged object (e.g., whether the tagged object has been moved since the start of the emergency) and other information.

In some embodiments of the user interface 300, a filter window 304 may be provided to enable a user to filter between types of items for display in the layout window 302. For example, a user may wish to more clearly see items that may be used to address needs that arise due to the emergency. For example, the user may wish to find a first aid kit, a defibrillator, a stretcher, etc., without displaying other items such as a laptop or data storage device that contain sensitive information. Accordingly, the user may select the emergency items button 306 from a range of options provided in the filter window 304. In response, the layout window 302 may be populated with only these emergency items. As another example, the user may be a data security officer who has been charged with ensuring the safety of company data. The data security officer may want to see tagged physical objects that are tagged due to the sensitivity of information they contain or embody. Accordingly, the data security officer may select the security items button 308 from the filter window 304. Another person may be tasked with ensuring that all of the employees that work on the floor of the building depicted in the layout window 302 are safely evacuated in the event of an emergency. This person may select to see people that are present in the building by selecting the people button 310. Other filters may be provided in the filter window 304, such as a moved items filter 308 that causes only the items that have moved since the emergency or since another specified time to be displayed in layout window 302. The filters may be applied exclusively or inclusively. For example, in some embodiments only one of the options presented by the filter window 304 may be selected at a given time. In other embodiments, multiple options may be selected in the filter window 304 and the tagged physical objects corresponding to the selected options may be displayed in the layout window 302. By selecting one or more options within the filter window 304, one or more of the tagged physical objects 303A-D may no longer be displayed in the layout window 302. The available filter options in the filter window 304 may depend on the level of access granted to the user.

In some embodiments, the filter window 304 may not be present. For example, in some embodiments the service provider server 140 may be configured to determine which physical objects are likely to be of interest or relevant to a particular user given the particular emergency condition. For example, the service provider server 140 may determine that a particular user is in a facility in a location in which a fire has occurred or is occurring. The service provider server 140 may send a notification to that particular user that includes the location of a tagged fire extinguisher. In some embodiments, user-defined settings may be used by the service provider server 140 to determine what physical objects are relevant or of interest to a particular user given a particular emergency condition. In some embodiments, a user 102 may be provided with the filter window 304 in a user interface and also receive customized notifications.

Some embodiments of the user interface 300 may include an anticipated items list 314. The anticipated items list 314 may be pre-populated by the service provider server 140 depending on the emergency indicated by the notification application 143 and by an identity of the user. For example, in the depicted embodiment the anticipated items list 314 includes buttons corresponding to an emergency exit, a first aid kit, and a fire extinguisher. A user of the user interface 300 may simply select one of these buttons, and the corresponding item may be highlighted in the layout window 302. The corresponding item may be one of tagged physical objects 303A-D.

The user interface 300 may further include an information status window 316. The information status window may provide a time/date stamp to assess information displayed in the layout window 302. The information status window 316 may include the time at which notification of the emergency was received by the notification application 143. The information status window 316 may also include an indication as to when the information displayed in the layout window 302 was last updated. The information status window 316 may also include a current time. This information may be useful in assessing how current the information in the layout window 302 is. As illustrated, about five minutes have passed since the last update to the information displayed in the layout window 302. Depending on the emergency and the information being requested, the information may or may not be current enough for a particular user. The information status window 316 may include a data refresh button 318. By selecting the data refresh button, the user may issue a command to the location monitoring application 142 to request updated information from the beacons 230. This data may be collected and processed by the service provider server 140 and the processed information may be communicated to the user through the user interface 300A.

Figure 3B:
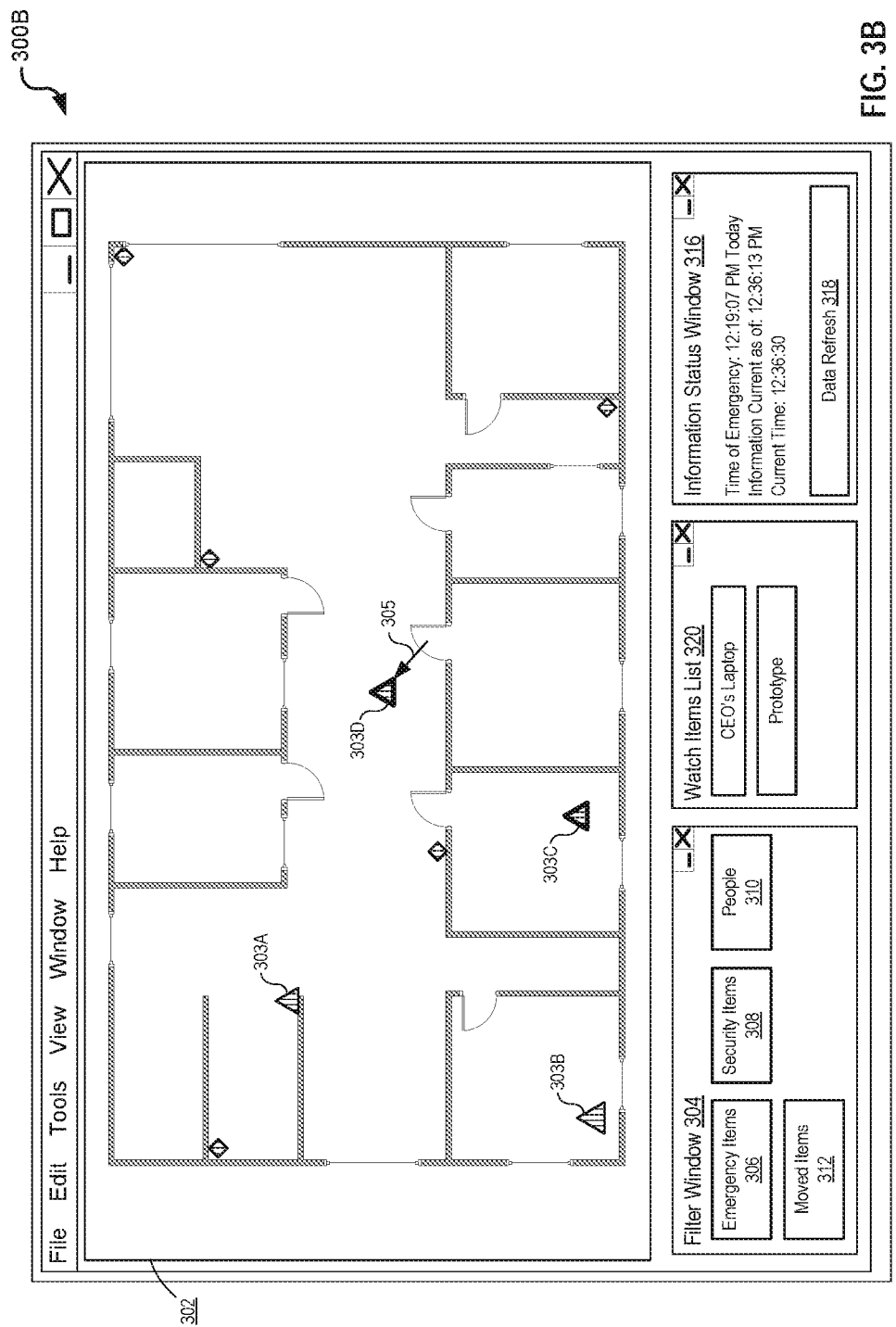
FIG. 3B is an exemplary user interface displaying remote monitoring of tagged objects at a facility during an emergency at a subsequent time, according to some aspects of the present disclosure.

FIG. 3B illustrated the user interface 300B, which is similar to the user interface 300A in many respects. User interface 300B presents information in the layout window 302 at a later time after an update to the displayed information. As illustrated, the location information is indicated in the information status window 316 as being obtained at 12:36:13 PM. The current time is displayed as 12:36:30. Thus, the most recent information is obtained less than 20 seconds previously. As shown in the user interface 300B, some of the tagged physical objects 303A-D have moved or are moving. The tagged stairway 303A has not moved, and the tagged physical object 303B has not moved. However, the tagged physical object 303C has moved from an open area to one of the rooms in the layout 302. As illustrated, the tagged physical object 303C is highlighted or otherwise visually altered to depict that it has moved during the emergency. Additionally, the tagged physical object 303D is depicted in connection with an arrow 305 that indicates recent movement in the direction illustrated by the arrow 305. Depending on the frequency with which the location information in the layout window 302 is updated, the arrow 305 may be shorter or longer to indicate the length of movement undergone during a time period. In some embodiments, the time period may be less than a second which may provide for near continuous tracking of movement of tagged physical objects.

The user interface 300B further includes a watch items list 320 which may be presented when security personnel log into the service provider server 140 to access data displayed in the user interface 300B. The watch items list 320 may include specific items of high-priority that may be tracked or monitored during an emergency. For example, the watch items list 320 as depicted in FIG. 3B includes a button corresponding to the CEO's laptop and a button corresponding to a prototype. By selecting one of the listed items in the watch items list 320, the layout window 302 may be altered to further distinguish the selected item or items. For example, if the prototype is the contact physical object 303D, selection of the prototype button from the watch items list 320 may alter the depiction in the layout window 302 of the tagged physical object 303D. In some embodiments, the alteration of the depiction in the layout window 302 may be the removal of the representations of the other tagged physical objects 303A, 303B, and 303C. In this way the security personnel may have an easier time monitoring the prototype, e.g. the tagged physical object 303D. When an item in the watch items list 320 fails to communicate with any of the beacons within the facility, an alert or notification may be provided to the security personnel through the user interface 300B. If the item fails to communicate with any of the beacons within the facility after having previously communicated with only some of the beacons and after having been observed as moving, the service provider server 140 and the location monitoring application 142 operating thereon may infer that the item has been removed from the facility. A time in which the item was last observed by location monitoring application 142 as being within the facility may be recorded and stored in the database 146.

Figure 3C:
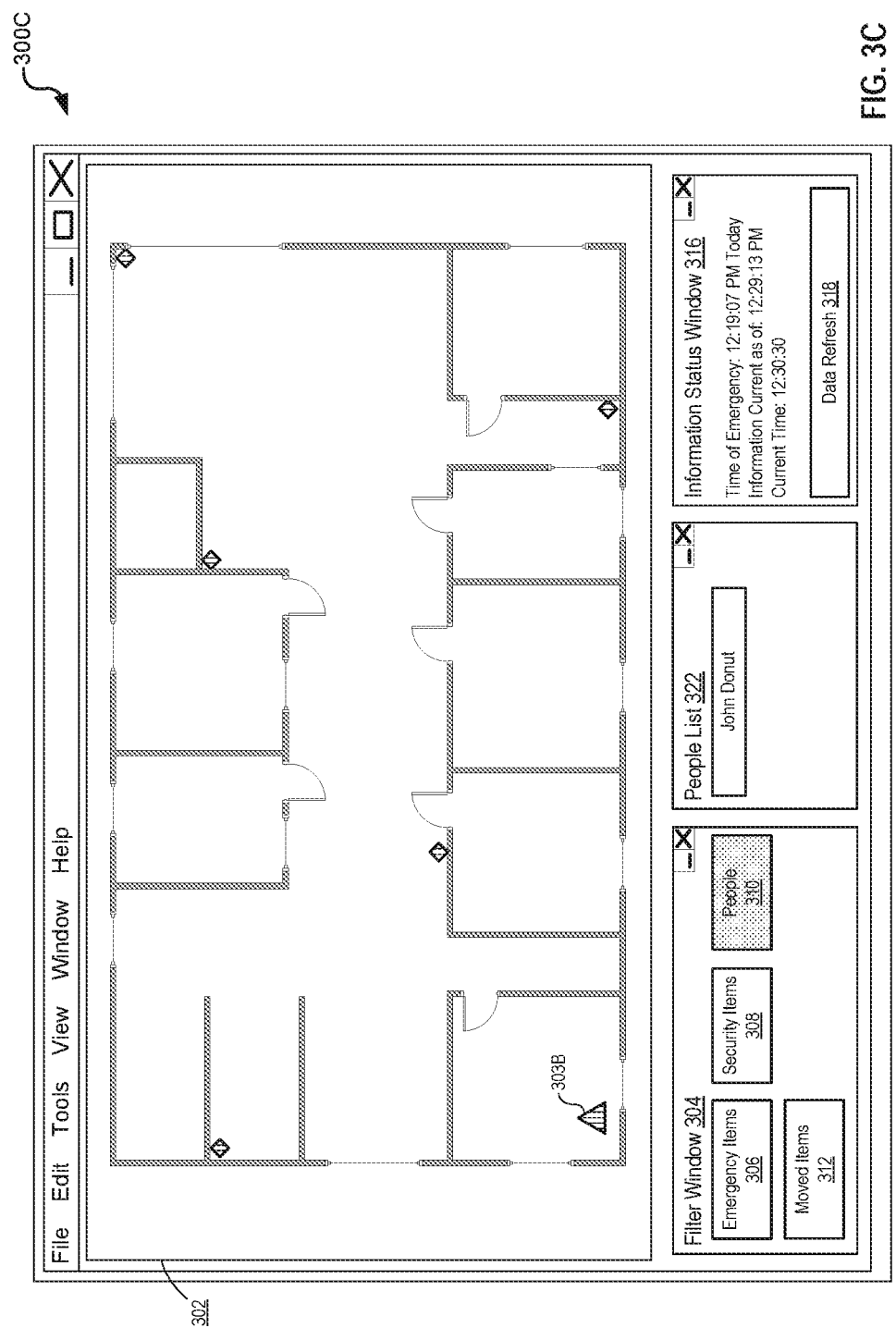
FIG. 3C is another exemplary user interface displaying remote monitoring of tagged objects at a facility during an emergency, according to some aspects of the present disclosure.

Referring now to FIG. 3C, shown therein is a user interface 300C, which shares many features in common with the user interface is 300A and 300B as described herein. The people filter 310 is applied. The user interface 300 C further includes a people list 322. The people list 322 may include a list of people that are or are expected to be in possession of a tagged physical object, such as a user device or a personal monitoring tag device. For example, employees may be checked in to the service provider server 140 upon entering their work location. When an emergency occurs, a list of the people whose tags are within communication range of the beacons within the facility may be compiled. In some embodiments, the people list 322 may display a list of people who are still in the facility. For example, the people list 322 indicates that one person, John Donut, is still in the facility approximately 10 minutes after the time of the emergency. This information, the identity of John Donut and his location within the building, may be provided to responders to search for John Donut. As another example, John Donut may be a patient in the hospital. Upon admission, the hospital may provide patients with a tag device, such as a hospital admissions bracelet, to facilitate monitoring and care of the patient. In an emergency situation in which in which a hospital building, wing, or floor is to be evacuated, the tag devices provided to patients on admission may be used with the service provider server 140 to ensure that all patients have been evacuated, by indicating which patients have not been evacuated.

As indicated by the user interfaces 300A, 300B, and 300C, different features and different information may be provided to a user of the service provider server 140 according to the specific user's role and/or requests and instructions provided through the user interface. These user interfaces may enable the monitoring of tagged physical objects in an emergency situation. In some embodiments, one of the user interfaces 300A, 300B, or 300C may be accessed by a user of the service provider server 140 through a user device 104 upon receipt of a customized notification from the service provider server 140. The notification may be customized for the user 102 based on an identity of the user 102, the location of the user device 104, predefined-settings of the user 102, and/or the emergency condition.

Figure 4:
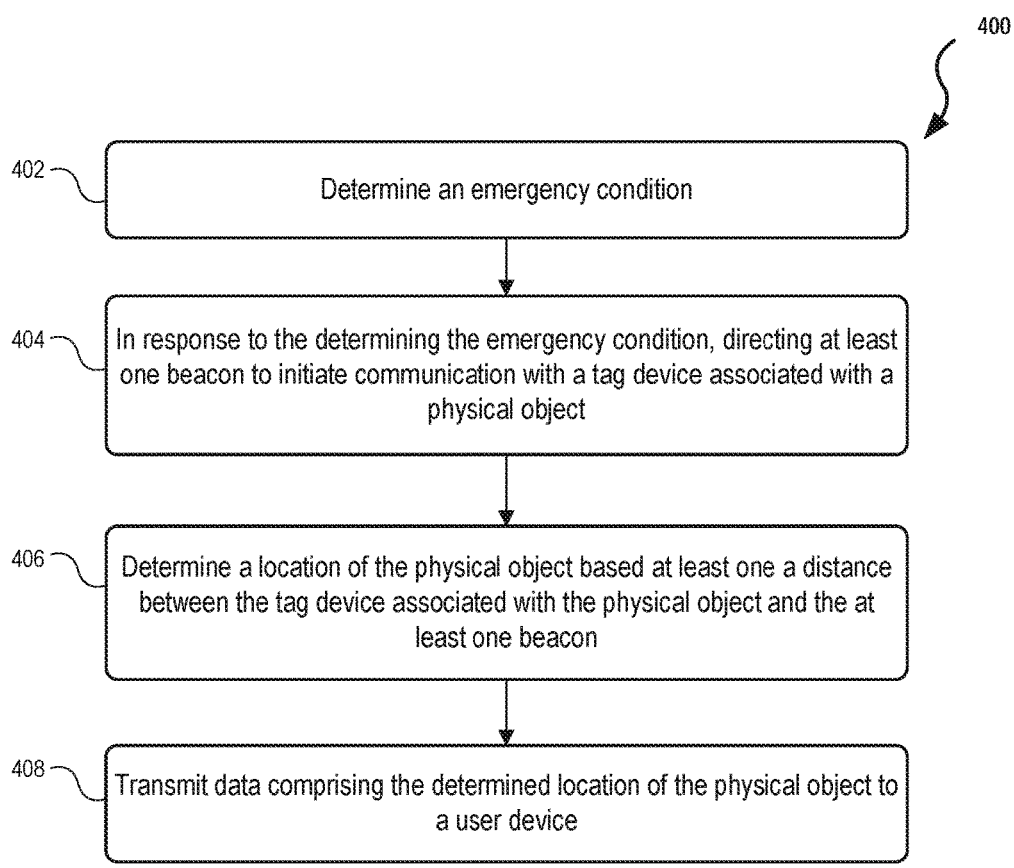
FIG. 4 is a flowchart of a method of locating one or more physical objects in an emergency condition, according to some aspects of the present disclosure.

FIG. 4 is a flowchart of a method 400 of locating one or more physical objects in an emergency condition. The method 400 is illustrated as a sequence of enumerated steps or operations. Embodiments of the method 400 may include additional operations before, after, in between, or as part of the enumerated steps. Note that one or more steps, processes, and methods described herein may be omitted, performed in a different sequence, or combined as desired or appropriate.

Embodiments of the method 400 may be performed by the service provider server 140 as described herein. In some embodiments, the method 400 may be stored as a set of instructions or executable code on a non-tangible computer readable medium. When the instructions are executed by one or more processors the enumerated operations may be performed. Aspects of the method 400 may be performed by the service provider server 140 of FIG. 1.

Embodiments of the method 400 may begin at step 402 in which an emergency condition is determined. The emergency condition may be determined based on a notification of an emergency condition that is received from an emergency notification service. The notification may be received by the notification application 143 operating on the service provider server 140. The notification application 143 may receive information describing the emergency condition from a plurality of beacons operating in an area, from an alarm system comprising smoke alarms, earthquake alarms, tsunami alarms, and/or burglar alarms, etc. A time at which the notification of the emergency condition is received may be recorded in a database 146.

At step 404 and in response to determining the emergency condition, at least one beacon is directed to initiate communication with a tag device associated with a physical object. In some embodiments, more than one beacon is directed to initiate communication with the tag device. The physical object may be a file cabinet, a computer, a safe, a first aid kit, a defibrillator, an emergency exit, a smart phone, a prototype, an employee, a patient, or any other physical object that may be decidedly monitored and/or located during an emergency. The direction to initiate communication with the tag device may be a direction to initiate a new communication to request updated information from the tag device. This updated information may include an identifier of the tag device and/or an identifier of the physical object with which the tag devices associated. The updated information may include new information or may include the same information previously sent. The tag device and the wireless beacon or beacons may connect using one of near field communication, radio communication, infrared communication, Bluetooth communication, and Bluetooth Low Energy (BLE) communication. Thus, the tag device may comprise one of a BLE communication module and/or and LTE Direct communication module, etc. The beacon or beacons may be range limited such that a plurality of fixed beacons may be used to monitor a desired area, such as a building or floor of the building.

At step 406, a location of the physical object is determined based at least on a distance between the tag device associated with the physical object and the at least one beacon or more than one beacon. The location of the physical object may be determined by determining the position of the tag device. This may be done by triangulating or otherwise calculating a position of the tag device from a plurality of distances between the tag device and two or more of the fixed beacons. This calculation may be performed by the location monitoring application 142 operating on the service provider server 140.

At step 408, data comprising the determined location is transmitted to a user device. The user device may be a laptop computer, a desktop computer, a smart phone, a wearable computer, etc., that may receive information from service provider server 140 over a network 150 and render that information into a user interface, like the user interfaces 300A, 300B, and 300C. For example, the data comprising the determined location may be provided to a monitoring application 112 being executed on a user device 104 of the user 102 of FIG. 1.

In some embodiments of the method 400, the data may comprise a notification that when accessed by the user causes the determined location of the physical object to be displayed in a user interface, like one of the user interfaces 300A, 300B, or 300C of FIG. 3A, 3B, or 3C. 8. Some embodiments may include operations of determining a subset of the system users based on the emergency condition transmitting a notification to each of the subset of the system users. The notification comprises the location of one or more physical objects that are likely to be of interest to each of the subset of the system users due to the emergency condition. For example, the notification may include the location of a fire extinguisher when a fire occurs. In another embodiments, the location of defibrillator may be provided to a user of the service provider system based on the emergency and information of the user, e.g., an indication that the user has been trained in use of the defibrillator. In general, a user may be provided with data the locate one or more physical objects based on the location of the user, the specific emergency condition, known user skills, certifications, or training, and/or pre-defined settings entered by the user. In this way, the locations of the most relevant physical objects to the user in the particular emergency conditions may be provided and accessed. Similarly, information that is unwanted or not useful to the user may not be communicate to the user during the emergency. This may be helpful in communicating the information that the user can beneficially act upon without overwhelming the user with unnecessary information in a stressful and/or dangerous circumstance.

Embodiments of the method 400 may further include providing a facility layout to the user device and overlaying an indicator of the physical object (or the associated tag device) onto the facility layout by registering the determined location to the facility layout. The method 400 may include accessing a pre-notification location of the physical object. The pre-notification location may be stored in a database 146 after being calculated by location monitoring application 142 from information previously stored in the database 146. The service provider server 140 may compare the pre-notification location of the physical object with the determined location of the physical object, and when a location change greater than a threshold is found by the comparison, the server 140 may transmit an alert to the user device. The threshold may have different values in different embodiments. For example, the threshold may be 6 inches in some embodiments and 10 feet in other embodiments. The beacons within the facility may be configured such that each beacon covers a defined area such as a room. In such embodiments, the threshold may be a location change in which the tag device leaves its original room.

In some embodiments of the method 400, after an interval or period of time has passed, a current distance may be gauged between the physical object and the fixed beacons to determine a current location of the physical object. The service provider server 140 may compare the current location of the physical object with the determined location of the physical object and, when a location change greater than a threshold is found by the comparison, an alert or notification may be transmitted to a user device. After an interval of time, a communication request may be initiated for the fixed beacons to communicate with the tag device. In the event that no response is received from the tag device by at least one of the fixed beacons, an alert may be transmitted to the user device. No response may be received in the event that the tag device has been moved beyond the limited range of the fixed beacons, and the event of the tag device has been destroyed, or in another event.

In some situations, a part of the building to which one of the beacons is a fixed may collapse in an earthquake. In some embodiments of the method 400, the beacons may be configured to determine their relative locations based on the signal strength of signals exchanged between the beacons at the direction of the service provider server 140. When notification of an emergency is received, the service provider server 140 may direct the beacons to exchange signals in order to determine the relative locations of the beacons. The service provider server 140 may access a set of previously determined relative locations of some or all of the beacons and compare the most current relative locations with the previously determined relative locations to determine a change in the relative location of any beacon has moved. When a beacon of the set of beacons has moved, the service provider server 140 may compensate for the change in the location of that beacon. In this manner, errors in determining the location of the tag device due to the movement of one or more beacons may be avoided.

Figure 5:
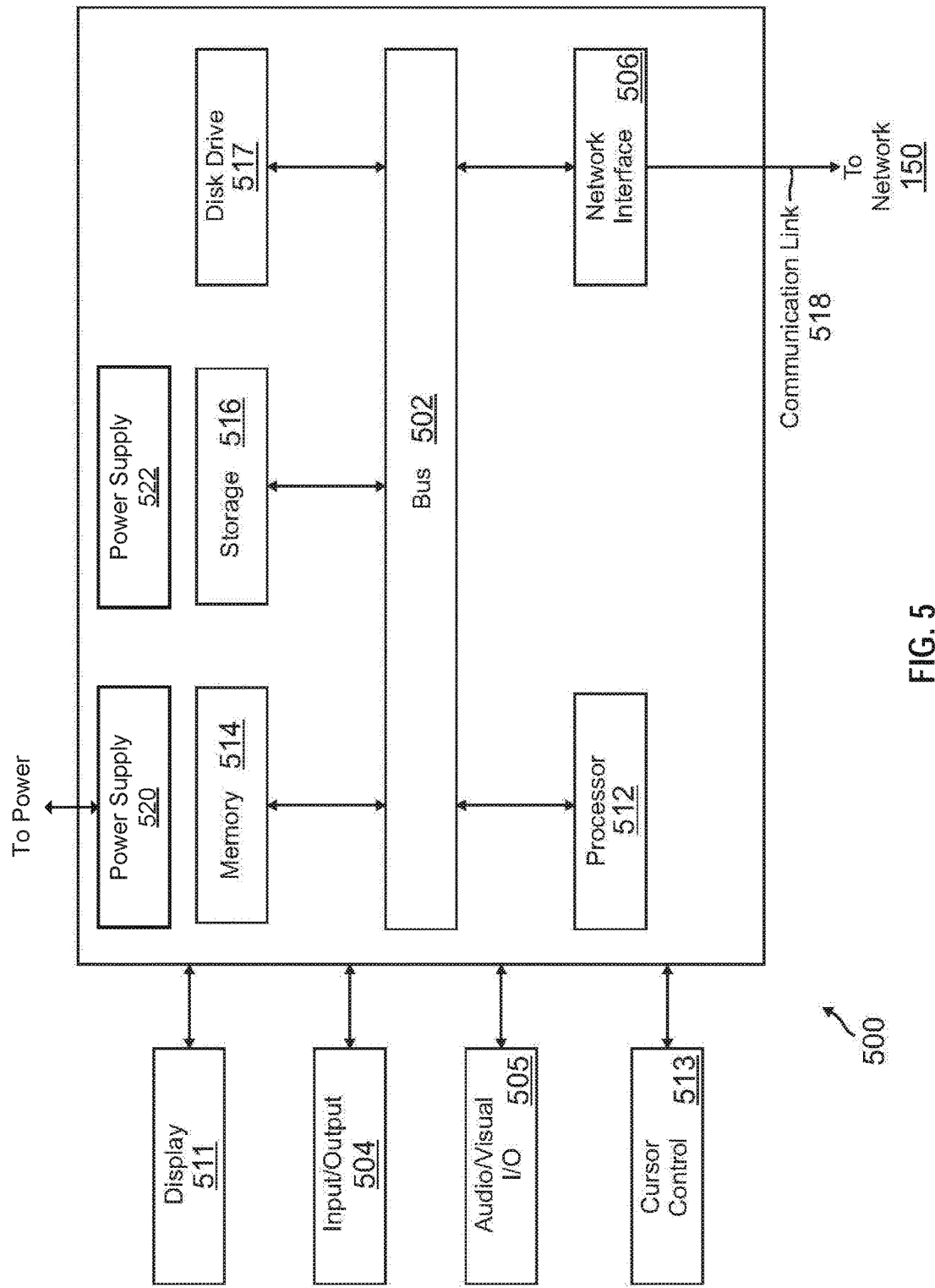
FIG. 5 is a block diagram of a computer system suitable for implementing one or more components included in FIG. 1, according to some aspects of the present disclosure.

FIG. 5 is a block diagram of a computer system suitable for implementing one or more components in FIG. 1, according to an embodiment. Some of the described components of FIG. 1 include the user device 104, the tag devices 120, the beacons 130, and the service provider server 140. In various embodiments, the user device may comprise a personal computing device (e.g., smart phone, a computing tablet, a personal computer, laptop, a wearable computing device such as glasses or a watch) capable of communicating with the network 150. In some embodiments, the user device may also communicate with the beacons. The tag device may comprise a Bluetooth device, key fob, badge, tag, etc., capable of communicating with the beacons. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use voice for inputting information by converting audio signals. Audio/Visual I/O component 505 may allow the user to hear audio. A transceiver or network interface 506 transmits and receives signals between computer system 500 and other devices, such as another user device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. For example, the system memory component, static storage component 516, and/or disk drive 517, may including instructions that when executed by the processor(s) 512 cause the processor(s) 512 to perform operations as described above in connection with the method 400 of FIG. 4.

In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Embodiments of the computer system 500 further include at least one power supply. As depicted in FIG. 5, the computer system 500 includes a first power supply 520 that supplies receives power into the computer system 500. The computer system 500 further includes a second power supply 522, such as a battery. The battery may be a replaceable battery or a hardwired battery. The second power supply 522 and be charged from the first power supply 520 such that in the event of a disruption to the power supply 520, the second power supply 522A provide power to keep the computer system 500 operational. As described herein, tag devices, such as the tag devices 120 and other tag devices described herein may have a battery-based power supply. The beacons described herein may include the battery-based power supply, and in some embodiments, further include an additional power-line-based power supply.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory storing location information for a tag device; and
   one or more hardware processors configured to execute instructions to cause the system to perform operations comprising:
   determining an emergency condition;
   in response to determining the emergency condition, directing at least one beacon to initiate communication with a tag device associated with a physical object;
   determining a location of the physical object based at least on a distance between the tag device associated with the physical object and the at least one beacon;
   transmitting data comprising the determined location of the physical object to a user device;
   after an interval of time, determining a current distance between the physical object and the at least one beacon to determine a current location of the physical object;
   comparing the current location of the physical object with the determined location of the physical object; and
   when a location change greater than a threshold is found by the comparison, transmitting an alert to the user device.

2. The system of claim 1, wherein the tag device and the at least one beacon connect using Bluetooth Low Energy (BLE) communication.

3. The system of claim 1, wherein the tag device comprises one of a BLE communication module, and LTE Direct communication module, and a radiofrequency identification (RFID) communication module.

4. The system of claim 1, wherein the physical object comprises a file cabinet, a computer, a safe, a first aid kit, a defibrillator, or a user device associated with a person.

5. The system of claim 1, the operations further comprising:
   determining relative locations of a plurality of beacons including the at least one beacon;
   accessing a set of previously determined relative locations of the beacons;
   determining a change in the relative locations of the beacons; and
   compensating for the change in relative locations when determining the location of the physical object.

6. The system of claim 1, the operations further comprising:
   receiving a location fixation signal originating from outside a facility containing the at least one beacon; and
   registering locations of a plurality of beacons comprising the at least one beacon according to the location fixation signal.

7. The system of claim 1, the operations further comprising:
   determining a subset of users based on the emergency condition; and
   transmitting a notification to each user of the subset of users.

8. The system of claim 7, wherein the notification comprises the location of the physical object, the physical object being determined of interest to each user of the subset of users due to the emergency condition.

9. A method for locating one or more physical objects in an emergency condition, the method comprising:
   determining an emergency condition;
   in response to the determining of the emergency condition, directing at least one beacon to initiate communication with a tag device associated with a physical object;
   determining a location of the physical object based at least on a distance between the tag device associated with the physical object and the at least one beacon;
   transmitting data comprising the determined location to a user device;
   accessing a pre-notification location of the physical object;
   comparing the pre-notification location of the physical object with the determined location of the physical object; and
   when a location change greater than a threshold is found by the comparison, transmitting an alert to the user device.

10. The method of claim 9, further comprising:
    providing a facility layout to the user device; and
    overlaying an indicator of the physical object onto the facility layout by registering the determined location to the facility layout.

11. The method of claim 9, wherein the tag device connects to the at least one beacon using one of near field communication, radio communication, infrared communication, Bluetooth communication, and Bluetooth Low Energy (BLE) communication.

12. The method of claim 9, further comprising:
    determining a subset of users based on the emergency condition; and
    transmitting a notification to each user of the subset of users, wherein the notification comprises the location of the physical object, the physical object being determined of interest to each user of the subset of users due to the emergency condition.

13. A method for locating one or more physical objects in an emergency condition, the method comprising:
    determining an emergency condition;
    in response to the determining of the emergency condition, directing at least one beacon to initiate communication with a tag device associated with a physical object;
    determining a location of the physical object based at least on a distance between the tag device associated with the physical object and the at least one beacon;
    transmitting data comprising the determined location to a user device;
    after an interval of time, determining a current distance between the physical object and the at least one beacon to determine a current location of the physical object;
    comparing the current location of the physical object with the determined location of the physical object; and when a location change greater than a threshold is found by the comparison, transmitting an alert to the user device.

14. The method of claim 9, further comprising:
after an interval of time, initiating a communication request for the at least one beacon to communicate with the tag device associated with the physical object; and
when a response is not received by the at least one beacon, transmitting a second alert to the user device.

15. A method for locating one or more physical objects in an emergency condition, the method comprising:
determining an emergency condition;
in response to the determining of the emergency condition, directing at least one beacon to initiate communication with a tag device associated with a physical object;
determining a location of the physical object based at least on a distance between the tag device associated with the physical object and the at least one beacon;
transmitting data comprising the determined location to a user device;
determining relative locations of a plurality of beacons including the at least one beacon;
accessing a set of previously determined relative locations of the beacons;
determining a change in the relative locations of at least one of the beacons; and
compensating for the change in relative locations when gauging the distance between the tag device associated with the physical object and the beacons to determine the location of the physical object.

16. A non-transitory computer-readable medium having stored thereon machine-readable instructions executable to cause a machine to perform operations comprising:
determining an emergency condition;
in response to the determining of the emergency condition, directing at least one beacon to initiate communication with a tag device associated with a physical object;
determining a location of the physical object based at least on a distance between the tag device associated with the physical object and the at least one beacon;
transmitting data comprising the determined location to a user device;
accessing a pre-notification location of the physical object;
comparing the pre-notification location of the physical object with the determined location of the physical object; and
when a location change greater than a threshold is found by the comparison, transmitting an alert to the user device.

17. A non-transitory computer-readable medium having stored thereon machine-readable instructions executable to cause a machine to perform operations comprising:
determining an emergency condition;
in response to the determining of the emergency condition, directing at least one beacon to initiate communication with a tag device associated with a physical object;
determining a location of the physical object based at least on a distance between the tag device associated with the physical object and the at least one beacon;
transmitting data comprising the determined location to a user device;
after an interval of time, determining a current distance between the physical object and the at least one beacon to determine a current location of the physical object;
comparing the current location of the physical object with the determined location of the physical object; and
when a location change greater than a threshold is found by the comparison, transmitting an alert to the user device.

* * * * *